(12) United States Patent
Kulzick et al.

(10) Patent No.: US 6,555,226 B1
(45) Date of Patent: Apr. 29, 2003

(54) POLYESTER RESIN FOR POWDER COATING

(75) Inventors: Matthew A. Kulzick, Warrenville, IL (US); Wayne R. Pretzer, Wheaton, IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/697,710

(22) Filed: Oct. 26, 2000

(51) Int. Cl.⁷ .................. B32B 27/38; B32B 27/36; C08L 63/00; C08L 67/03
(52) U.S. Cl. .............. 428/413; 428/480; 525/438; 528/272
(58) Field of Search ............... 525/438, 437, 525/444, 448, 440, 934; 428/413, 480; 528/272

(56) References Cited

U.S. PATENT DOCUMENTS

| 5,326,832 A | | 7/1994 | Belder et al. ............. 525/438 |
| 6,025,030 A | * | 2/2000 | Decker et al. ............ 427/386 |
| 6,048,949 A | * | 4/2000 | Muthiah et al. .......... 525/438 |
| 6,184,311 B1 | * | 2/2001 | O'Keeffe et al. ......... 525/438 |
| 6,284,845 B1 | * | 9/2001 | Panandiker et al. ...... 525/438 |

FOREIGN PATENT DOCUMENTS

| EP | WO9932567 | 7/1999 |
| EP | WO9940143 | 8/1999 |
| EP | WO0023530 | 4/2000 |

* cited by examiner

Primary Examiner—Robert Dawson
Assistant Examiner—Michael J Feely
(74) Attorney, Agent, or Firm—Mary Jo Kanady

(57) ABSTRACT

A carboxyl group-containing polyester resin having suitable properties for use in a powder coating for wood and other temperature-sensitive substances is disclosed.

22 Claims, No Drawings

POLYESTER RESIN FOR POWDER COATING

BACKGROUND OF THE INVENTION

This invention relates generally to a carboxyl group-containing polyester resin for use in a powder coating and more particularly concerns an aforesaid polyester having suitable properties for use in a powder coating for wood and other temperature-sensitive substrates.

Powder coatings offer the advantages of high coating efficiency, excellent mechanical properties and zero emission of volatile organic compounds. Carboxyl group-containing polyester resins for use in powder coatings are well known in the art, and in practice these polyesters are processed with epoxy resins to form binding agents for powder coatings. Powder coatings based on polyester resins are particularly desirable in some applications because of their excellent appearance, resistance to overbake, mechanical properties and weatherability. They have found application in coating a wide range of metal substrates, and it would be highly desirable to be able to use powder coatings based on polyester resins on nonmetallic temperature sensitive substrates such as wood, engineered wood products and plastics. Many such temperature sensitive substrates are exposed directly or indirectly to sunlight or heat. Because of their superior weatherability and color stability, powder coatings based on polyester resins would be particularly effective for use with temperature sensitive substrates, for example, engineered wood products such as medium density fiber board.

Excellent surface smoothness and hardness and a low curing temperature are properties that a powder coating must have for use with temperature sensitive substrates. Existing powder coatings based on polyester resins generally possess the requisite properties of surface hardness and low curing temperature but do not form surfaces with the smoothness comparable to other finishing methods. The inability of powder coatings based on polyester resins to provide the requisite surface smoothness is generally the result of the high viscosities of the polyester resin bases. Achieving a surface smoothness that is equivalent to that achieved with other finishing systems such as liquid paints and laminates is essential in order for powder coatings based on polyester resins to be used effectively with temperature-sensitive substrates such as wood, engineered wood products and plastics.

In order to form a smooth finish, the powder coating must melt within a particular temperature range to permit timely and ample flow of the polymeric material prior to crosslinking. It is also essential that the formulated coating powders remain in a free-flowing, finely divided state for a reasonable period of time after they are manufactured and packaged. Most polyester resins that are used as binders for powder coatings are amorphous solids. The use of multiple components to produce resins having specialized properties generally reduces their potential for crystallinity. The resulting glass transition temperature ($T_g$) of these resins must exceed the storage temperature to which the formulated powder will be exposed. When storage temperatures reach or exceed the $T_g$, the amorphous resin beings to "cold flow", resulting in agglomeration of the finely divided particles, thereby rendering the powder unsuitable for application. Therefore, the $T_g$ and melt viscosity are important considerations for powder coating resins.

The viscosity of the epoxy-polyester powder-coating resins presents an area for improvement. The polyester resins have a relatively high viscosity (generally greater than 20 poise in a polyester designed for use in a mixture containing 70 weight percent polyester) under curing conditions. (Viscosity is measured using an ICI cone and plate viscometer at 200° C.) Resins with a lower melt viscosity are desirable because they flow together and fuse better to provide a smoother and a more even appearance, and they are easier to process into a powder. It would be desirable to develop a powder-coating composition with substantially the same or better flow and/or appearance and lower viscosity under ordinary use conditions.

It is therefore a general object of the present invention to provide an improved polyester resin that is suitable as a base material for a powder coating for a temperature sensitive substrate.

More particularly, it is an object of the present invention to provide an improved carboxyl group-containing polyester resin having a viscosity of less than 1500 centipoise as well as a sufficient glass transition temperature, acid number and hydroxyl number to be useful in a powder coating for a temperature sensitive substrate.

It is a related object of the present invention to provide an improved powder coating based on carboxyl group-containing polyester resins for use on temperature sensitive nonmetallic substrates.

Other objects and advantages of the present invention will become apparent upon reading the following detailed description and appended claims.

SUMMARY OF THE INVENTION

The present invention is a carboxyl group-containing polyester resin for use in a powder coating and comprising (a) from about 45 to 55 mole percent of an aromatic diacid component of which at least 90 mole percent is isophthalic acid, (b) from about 40 to about 50 mole percent of a diol component, (c) from about zero to about 7 mole percent of an aliphatic diacid containing from 4 to 13 carbon atoms, and (d) from about zero to about 3 mole percent of a branching agent having at least 3 alcohol or acid groups or both, such that the polyester resin has a glass transition temperature of 44° to 55° C., an acid number of 35–55 milligrams of potassium hydroxide per gram of resin, a hydroxyl number less than 10 milligrams of potassium per gram of resin, and a viscosity of less than 1500 centipoise when measured at 200° C. using ICI cone and plate viscometer. The present invention is also a powder coating comprising the aforesaid polyester resin.

DETAILED DESCRIPTION OF THE PREFERRED EMBODIMENTS

Polyester resins find use in polyester-isocyanate, polyester-epoxy hybrid, and polyester-triglycidylisocyanurate systems. The stability of the finished polyester resin-based powder coating material during storage, the flow properties of the enamel during the cure cycle, and the ultimate performance of the cross-linked coating are all dependent upon the composition of the polyester binder resin.

The carboxyl group-containing polyesters of the present invention are prepared by well known polycondensation methods, for example, by esterification or interesterification, optionally in the presence of typical catalysts such as dibutyl tin or tetrabutyl titanate whereby, through a suitable choice of reaction conditions, polyester resins having the desired properties are obtained.

After being formed, the polyester resins of the present invention have a glass transition temperature of 44° to 55° C., an acid number of 35–55 milligrams of potassium hydroxide per gram of resin, a hydroxyl number of less than 10 milligrams of potassium hydroxide per gram of resin, and a viscosity of less than 1500 centipoise.

It has been found that this particular combination of glass transition temperature, acid number, hydroxyl number and viscosity render a polyester resin of the present invention especially useful in powder coatings for use on temperature sensitive metallic substrates. The glass transition temperature must exceed the storage temperature to which the formulated powder will be exposed. Furthermore, in order to form a smooth finish, the powder coatings must melt and have a sufficiently low viscosity within a particular temperature range to permit timely and ample flow of the polyester resin prior to crosslinking.

However, the viscosity of the polyester resin is influenced by a number of conflicting factors. For example, the viscosity of a resin is lower if its molecular weight is lower. However, the acid number of the resin is too high if the molecular weight of the resin is too low. Similarly, the viscosity of a resin is lower if its branching is eliminated or reduced. However, increased levels of branching improve the reactivity of the polyester resin so that it gels rapidly upon formulation. Furthermore, resins with flexible backbones have lower viscosities. However, the backbone of the resin must be rigid enough to give a sufficiently high glass transition temperature. The composition of the polyester resin is critically important in achieving the balance of glass transition temperature, acid number, hydroxy number and viscosity of the resin that are necessary to use it in powder coating compositions.

A polyester resin of the present invention is prepared from an aromatic diacid component, a diol component, an aliphatic diacid and a branching agent, and contains moieties that are derived from each of those materials. Thus, a polyester resin of the present invention is comprised of from about 45, preferably from about 47, to about 55, preferably to about 52, mole percent of the aromatic diacid component of which at least 90 mole percent is isophthalic acid. The remainder, if any, of the aromatic diacid component is terephthalic acid or phthalic acid, and preferably is terephthalic acid.

A polyester resin of the present invention is also comprised of from about 40, preferably from about 45, to about 50 mole percent of the diol component. The diol component comprises at least one glycol containing from two to ten carbon atoms. Suitable glycols include ethylene glycol, propane-1,2-diol, propane-1,3-diol, butane-1,2-diol, butane-1,4-diol, butane-1,3-diol, 2,2-dimethylpropanediol-1,3 (i.e., neopentyl glycol), hexane-2,5-diol, hexane-1,6-diol, 2,2-[bis-(4-hydroxycyclohexyl)]-propane, 1,4-dimethylolcyclohexane, diethylene glycol, dipropylene glycol and 2,2-bis-[4-(2-hydroxylethoxy)]-phenylpropane and smaller amounts of polyols, such as glycerol. Preferably, the diol component is at least one of neopentyl glycol and butylethyl propanediol. More preferably the diol component comprises from about 70 to about 100 weight percent of neopentyl glycol, up to about 30 weight percent of ethylene glycol and up to about 20 weight percent of a linear aliphatic glycol containing from four to twelve carbon atoms, which most preferably is 1,4-butanediol or 1,6-hexanediol.

A polyester resin of the present invention is additionally comprised of from about zero, preferably from about two, to about 7, preferably to about five mole percent of an aliphatic diacid containing from 4 to 13 carbon atoms. The aliphatic diacid serves as a modifying agent that affords fine tuning of the performance and physical properties of the polyester resin such as viscosity and glass transition temperature. The aliphatic diacids can be acyclic or cycloaliphatic such as, for example, succinic acid, glutaric acid, adipic acid, maleic acid, fumaric acid, tetrahydrophthalic acid, hexahydroendomethylenetetrahydrophthalic acid, azelaic acid, sebacic acid, decanedicarboxylic acid, or cyclohexanedicarboxylic acid. The aliphatic diacid is preferably adipic, succinic, maleic or fumaric and more preferably is adipic acid.

A polyester resin of the present invention is further comprised of from about zero, preferably from about 0.1, to about two, preferably to about 0.5 mole percent of a branching agent having at least 3 alcohol groups or acid groups or a combination of alcohol and acid groups. Suitable branching agents include trimethylolpropane, trimellitic anhydride, glycerol, or pyromellitic dianhydride, and preferably the branching agent is trimethylolpropane or trimellitic anhydride.

One preferred embodiment of a polyester resin of the present invention comprises (a) from about 47 to about 50 mole percent of an aromatic diacid component comprising at least about 95 weight percent of isophthalic acid and up to about 5 weight percent of terephthalic acid; (b) from about 45 to about 50 mole percent of a glycol component comprising at least about 80 weight percent of neopentyl glycol; (c) from about 2 to about 5 mole percent of adipic acid; and (d) from about 0.2 to about 1 mole percent of the branching agent.

Another preferred embodiment of a polyester resin of the present invention comprises (a) from about 50 to about 55 mole percent of an aromatic diacid component comprising at least about 95 weight percent of isophthalic acid and up to about 5 weight percent of terephthalic acid; (b) from about 45 to about 50 mole percent of a glycol component comprising at least about 50 weight percent of neopentyl glycol, from about 5 to about 20 mole percent of ethylene glycol and from about 5 to about 20 mole percent of hexanediol; and from 0 to 20 mole percent cyclic diols such as 1,4-cyclohexanedimethanol, hydrogenated bis-phenol A, the ethylene oxide adduct of bis-phenol A, or combinations thereof; (c) from zero to about 1 mole percent of adipic acid; and (d) from zero to about 1 mole percent of the branching agent.

A further preferred embodiment of the polyester resin of the present invention comprises (a) from about 47 to about 52 mole percent of isophthalic acid; (b) from about 45 to about 50 mole percent of neopentyl glycol; (c) from about 2 to about 4 mole percent of adipic acid; and (d) from about 0.1 to about 0.4 mole percent of trimethylolpropane or trimellitic anhydride; such that the acid number is from about 40 to about 45 milligrams of potassium hydroxide per gram of polyester resin, a hydroxyl number of less than about 10 milligrams of potassium hydroxide per gram of polyester resin, a glass transition temperature of 45–52° C. and a melt viscosity of less than about 1300 centipoise.

Another preferred embodiment of the polyester resin of the present invention comprises (a) from about 47 to about 52 mole percent of isophthalic acid; (b) from about 20 to about 45 mole percent of neopentyl glycol up to about 10 mole percent of ethylene glycol and up to about 10 mole percent of 1,6-hexanediol and from 0 to 10 mole percent cyclic diols such as 1,4-cyclohexanedimethanol, hydrogenated bis-phenol A, the ethylene oxide adduct of bis-phenol A, or combinations of thereof; (c) from about 2 to about 5 mole percent of adipic acid; and (d) from about 0.1 to about 0.4 mole percent of trimethylol propane or trimellitic anhydride; such that the acid number is from about 40 to about 45 milligrams of potassium hydroxide per gram of polyester resin, a hydroxyl number of less than about 10 milligrams of potassium hydroxide per gram of polyester resin, a glass transition temperature of 44–50° C., and a melt viscosity of less than about 1300 centipoise.

The present invention is also a powder coating composition which comprises the aforesaid polyester resin of this invention and a multifunctional epoxy resin component. By multifunctional, it is meant that the epoxy resin component contains on average more than two epoxy groups per molecule. The multifunctional epoxy resin component preferably contains on average at least about 2.05 epoxy groups per molecule, preferably contains on average at least about 2.2 epoxy groups per molecule, more preferably contains on average at least about 2.3 epoxy groups per molecule, and most preferably contains at least about 2.5 epoxy groups per molecule. The maximum number of epoxy groups is limited primarily by practical considerations, such as the viscosity of the resin and the ease of fabrication. Preferably the epoxy resin contains up to only about 6 epoxy groups per molecule, and more preferably up to only about 4 epoxy groups per molecule on average.

The multifunctional epoxy resin component has preferably an average epoxy equivalent weight of at least about 400, more preferably at least about 450, and most preferably at least about 500. The average epoxy equivalent weight of the multifunctional epoxy resin component is preferably up to only about 1200, more preferably up to only about 900 and most preferably up to only about 560. The viscosity of the multifunctional epoxy resin component at 175° C. is preferably less than about 50 poise and more preferably less than about 30 poise. In most cases, the viscosity of the resin at about 175° C. will be at least about 5 or 10 poise.

The epoxy groups are typically glycidyl ether groups that result from reacting epihalohydrin with a multifunctional amine, thio or phenolic compound. They typically are represented by the formula:

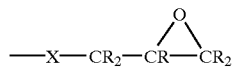

wherein each R is independently hydrogen or a lower alkyl group (containing 1 to 8 carbon atoms), and X is —O—, —S—, or —NR—. Each R is most preferably hydrogen. Each X is preferably oxygen. Multifunctional epoxy resins can also be formed by polymerization of an epoxy functional monomer such as glycidyl acrylate or glycidyl methacrylate.

The multifunctional epoxy resin component may contain a single multifunctional resin or a mixture of resins. If it is a mixture of epoxy resins, then not all epoxy resins in the mixture need to be multifunctional, as long as the average for epoxy resins in the composition meets the previously-described criteria. The multifunctional epoxy resin component may optionally contain, for instance, at least one multifunctional epoxy resin and a difunctional resin, as long as their proportions are selected so that the entire epoxy resin component averages more than 2 epoxy groups per molecule. For instance, the multifunctional epoxy resin composition may contain a mixture of bisphenol A epoxy resin and epoxy novolac resins. Preferably, the amount of monofunctional epoxy resins in the epoxy resin component is minimized.

Suitable multifunctional epoxy resins and processes to make them are described in numerous published references such as: Walker, U.S. Pat. No. 4,868,059 (Sep. 19, 1989); Schrader, U.S. Pat. No. 4,474,929 (Oct. 2, 1984); Berman, U.S. Pat. No. 4,604,317 (Aug. 5, 1986); Wang, U.S. Pat. No. 4,672,103 (Jun. 9, 1987). Other multifunctional epoxy resins are commercially available from The Dow Chemical Company under the tradenames D.E.R.® 642U, D.E.R.® 672U and the D.E.N.® series. (trademark of The Dow Chemical Company). The multifunctional resins are usually glycidyl ethers of novolacs, trisphenols, and triglycidylisocyanurate. The resins can typically be made by contacting a polyphenol with epichlorohydrin in the presence of a suitable catalyst. Alternatively, suitable epoxy resins can be made by polymerizing epoxy functional monomers such as glycidyl acrylate or glycidyl methacrylate with acrylic, methacrylic, or styrenic monomers. Such processes are well-known to persons of ordinary skill in the art.

The epoxy resin and the polyester resin are preferably used in a ratio to provide about equivalent numbers of epoxy groups and acid groups within the composition. The composition preferably contains at least about 0.5 epoxy groups per acid group, more preferably at least about 0.75 epoxy groups and most preferably at least about 0.9 epoxy groups. The composition preferably contains no more than about 1.5 epoxy groups per acid group, more preferably no more than about 1.25 epoxy groups and most preferably no more than about 1.1 epoxy groups.

The weight ratio of epoxy resin component to polyester resin component is between 20:80 and 80:20. Compositions that contain more than about 50 parts of epoxy resin per hundred parts of polyester resin (in other words, a 50:50 weight ratio) usually require specially tailored epoxy and polyester resins (with special acid number and epoxy equivalent weight) to meet the previously stated equivalency criteria. The preferred weight ratio of the epoxy resin component and the polyester resin component depends upon the composition of the resins and their equivalent weight per functional group. For the most common epoxy resin and polyester, the weight ratio of polyester resin component to epoxy resin component is preferably at least 50:50 and most preferably at least 60:40. The weight ratio of polyester component to epoxy component is preferably less than about 75:25 and most preferably less than about 70:30.

The composition preferably contains a catalyst to promote curing between the epoxy and the polyester resins. Such catalysts and their use are well known in the art. Examples of suitable curing catalysts include amines and ammonium salts, phosphines and phosphonium salts, and imidazoles. The use of catalysts such as 1-methylimidazole is also described in McLafferty et al., U.S. Pat. No. 4,910,287 (Mar. 20, 1990). The composition preferably contains 0.01 to 2 part catalyst per 100 parts resin (phr); it more preferably contains about 0.05 to 0.5 phr catalyst. The composition may also contain curing agents for the epoxy resin, such as amines, polyphenols and imidazoles. It preferably contains no curing agent other than the polyester resin. The composition may also contain other additives, such as fillers, stabilizers, pigments, flow-modifiers and anti-cratering agents.

The components of the composition are typically premixed before they are used. For instance, they may be extruded together at a temperature below their curing temperature, and then converted to a powder. The powder composition preferably contains particles of a size suitable for powder-coating applications. The average particle size is preferably at least about 5 μm in diameter and more preferably at least about 10 μm. The average particle size is preferably less than about 100 μm and more preferably less than about 50 μm.

The powder-coating may be applied in a manner that is usual for powder-coating resins. Powder-coating application and use is described in detail at Tess, "Epoxy Resin Coatings," *Epoxy Resins* (2d Ed.) at 772–78 (Marcel-Dekker 1988). In summary, the powder may be applied to a preheated substrate, so that heat from the substrate causes the powder to melt, flow together, fuse and cure to form a coating; or the powder may be applied to a cool substrate which is subsequently heated to make the powder melt, flow, fuse and cure. The curing temperature is preferably between 110° C. and 160° C. and most preferably between 120° C. and 140° C.

The substrate is usually wood, engineered wood products or plastics, but may be any temperature-sensitive material that can withstand curing temperatures. The powder is applied to the substrate by known methods such as electrostatic spraying, fluidized bed application, or electrostatic fluidized bed. The process is preferably continued until the cured coating has a thickness of at least about 3 mil and most preferably at least about 5 mil. In most cases, the coating is preferably less than about 6 mil thick. The powder-coating should be heated long enough to cure to meet required properties. It is preferably baked for at least about 5 minutes. The coating is preferably baked for less than about 20 minutes, although this is not critical.

The present invention will be more clearly understood from the following specific examples. While the invention is described in connection with the specific examples below, it is to be understood that these are for illustrative purposes only. Many alternatives, modifications and variations will be apparent to those skilled in the art in the light of the examples below, and such alternatives, modifications and variations fall within the scope and spirit of the appended claims.

EXAMPLE 1

Forty seven and one-half moles of neopentyl glycol were introduced into a reactor equipped with a steam jacketed adiabatic condensor, an inert gas inlet, a mechanical stirrer, a theromocouple, a condensor and a collector for condensed vapor (water). The reactor contents were heated to 130° C. until the neopentyl glycol melted. Then 48.6 moles of isophthalic acid, 3.6 moles of adipic acid, 0.3 mole of trimethylolpropane, and 0.60 gram of Fascat 4100 were introduced to the reactor, and the reactor contents were heated until the temperature reached 230° C. At this point, 95 weight percent of the theoretical amount of water produced in the polyesterification reaction had been collected in the condensed vapor collector. The reaction mixture was sampled and its carboxyl number was determined. The reaction was allowed to continue at 230° C. until the carboxyl number of the reaction mixture reached 40–42 milligrams of potassium hydroxide per gram of the polyester resin product, a hydroxyl number of 5 milligrams of potassium hydroxide per gram of the resin, a glass transition temperature of 51° C. and an ICI viscosity at 200° C. of 1150 centipoise.

EXAMPLES 2–10

Following the procedure of Example 1, a series of polyesterifications was performed in Examples 2–10 using the materials and their amounts shown in Table 1 to obtain carboxyl-terminated polyesters having the properties also shown in Table 1.

EXAMPLES 11–16

Following the procedure of Example 1, a series of polyesterifications were performed using various combinations of glycols to form a series of carboxyl-terminated polyesters. The materials and their amounts employed are shown in Table 2 and the properties of the polyesters produced are also shown in Table 2.

EXAMPLE 17

931 grams of the polyester resin prepared in Example 5 was dry mixed in a Henchel mixer at 20,000 rpm for 60 seconds with 200 grams of Tipure 900 titanium oxide, 69 grams of Araldite PT-810 triglycidylisocyanurate, 10 grams of BYK-366P flow agent, 10 grams of Benzoin, and 20 grams of Curzol C17 catalyst. The resulting mixed powder was then extruded through a laboratory scale APV twin screw extruder with zone temperatures of 40° and 90° C. The extrudate was coarse ground through the Henchel mixer and then further ground using a micron products clarifier to produce a powder paint.

Medium density fiber board test panels were heated to 120° C. for 10 minutes, and the aforesaid powder paint was applied to a thickness of 3.5–5.5 microns to the fiber board panels at 120° C. using a Nordsen spray gun. The sprayed test panels were cured at 120° C. for 15 minutes. The panels were tested using ASTM methods for MEK double rubs, cross-hatch adhesion, pencil hardness and 60% and 20% gloss. The smoothness of the resulting coatings was determined by visual inspection. The results are presented in Table 3. In reporting the results, "excellent" indicates no observable surface irregularities, "good" indicates some signs of orange peel, and "poor" indicates a noticeable orange peel pattern on the test panels.

EXAMPLES 18–21

A series of additional powder coatings was prepared on medium density fiber board test panels using the method described in Example 17 but using different polyester resins. The ingredients and amounts thereof employed and the properties of the resulting coatings are presented in Table 3.

EXAMPLES 22–24

A series of powder coatings was prepared on medium density fiber board test panels using the procedure described in Example 17, except as described below, and using two powder coating formulations containing different polyester resins and cured with glycidyl ether polymers. Reichold 244A and 229-30 are glycidyl functional acrylic polymers. Before the powder paint was applied, the test panels were heated at 180° C. for 5 minutes and allowed to cool for 2 minutes, and then were sprayed with the powder paint to form a film of 3.5–5.5 mil and finally cured for 10 minutes. The ingredients and amounts thereof employed and the properties of the resulting coatings are presented in Table 4.

The results shown in Table 1 illustrate suitable compositions where the glycol is exclusively neopentyl type, either neopentyl glycol, butylethylpropane diol (BEPD), or combination of the two. Such systems would be expected to give the test weathering and moisture resistance but cannot be readily formulated to achieve low gloss power coatings (Table 4).

The results shown in Table 2 illustrate suitable compositions formulated with a range of glycols in addition to neopentyl type glycols. These resins can be formulated to form low gloss powder coatings as illustrated in Table 4.

The results in Table 3 illustrate a range of powder coating formulations which yield coatings with exceptional smoothness and very high gloss.

The results in Table 4 illustrate a range of powder coating formulations which yield coatings with very low gloss when using the resin compositions of Table 2 or with immediate gloss when using the resin formulations of Table 1.

TABLE 1

| Materials | Example No | | | | | | | | |
|---|---|---|---|---|---|---|---|---|---|
| | 2 | 3 | 4 | 5 | 6 | 7 | 8 | 9 | 10 |
| Amounts Employed (mole %) | | | | | | | | | |
| Neopentyl glycol | 38.0 | 47.2 | 47.1 | 48.0 | 47.4 | 48.4 | 48.5 | 48.0 | 48.0 |
| Adipic Acid | 3.6 | 3.6 | 3.8 | 5.0 | 5.0 | 4.9 | 4.9 | 3.5 | 3.5 |
| Isophthalic Acid | 48.6 | 48.7 | 48.5 | 47.0 | 47.6 | 46.5 | 49.8 | 42.4 | 39.4 |
| Terephthalic Acid | — | — | — | — | — | — | — | 6.0 | 8.0 |
| Trimethyl Propane | 0.3 | 0.6 | 0.7 | — | — | — | — | — | — |
| Trimellitic Anhydride | — | — | — | — | — | — | 2.3 | — | — |
| BEPD[1] | 9.5 | — | — | — | — | — | — | — | — |
| Polyester Properties | | | | | | | | | |
| Acid Number | 45 | 45 | 43 | 42 | 54 | 34 | 51 | 40 | 41 |
| Glass transition temperature | 46 | 49 | 49 | 48 | 51 | 53 | 51 | 50 | 49 |
| ICI Viscosity @ 200° C. | 1000 | 1300 | 1200 | 980 | 780 | 1490 | 1100 | 1250 | 1400 |

[1]butylethylpropanediol

TABLE 2

| | Amounts Employed | | | | | |
|---|---|---|---|---|---|---|
| | Example No. | | | | | |
| Materials | 11 | 12 | 13 | 14 | 15 | 16 |
| Amounts Employed (mole %) | | | | | | |
| Neopentyl glycol | 33.9 | 37.1 | 37.4 | 37.4 | 31.9 | 24 |
| Adipic acid | 0.9 | — | — | — | 0.9 | — |
| Isophthalic Acid | 51.2 | 52.1 | 52.1 | 41.7 | 51.2 | 52.1 |
| Terephthalic Acid | — | — | — | 10.4 | — | — |
| Trimethylol propane | 0.3 | 0.3 | — | — | 0.3 | 0.1 |
| 1,6-Hexanediol | 8.2 | 5.0 | 5.0 | 5.0 | 10.2 | 7.1 |
| Ethylene glycol | — | — | — | — | — | 9.2 |
| 1,4-Cyclohexanedimethanol | — | — | — | — | — | 7.4 |
| Polyester Properties | | | | | | |
| Acid Number | 40 | 41 | 43 | 45 | 47 | 42 |
| Glass transition temperature | 45 | 53 | 51 | 52 | 43 | 50 |
| ICI Viscosity @ 200° C. | 1150 | 1400 | 1150 | 1200 | 900 | 1300 |

TABLE 3

| | Example No. | | | | |
|---|---|---|---|---|---|
| Materials | 17 | 18 | 19 | 20 | 21 |
| Amounts Employed (grams) | | | | | |
| Resin From Example | 5 | 9 | 4 | 13 | 14 |
| Polyester | 931.0 | 747.2 | 929.0 | 929.0 | 926.0 |
| Araldite PT-810[1] | 69 | 52.8 | 71.0 | 71.0 | 74.0 |
| Tipure R-900[2] | 200 | 160 | 200 | 200 | 200 |
| Curzol C17z[3] | 20 | 16 | 20 | 20 | 20 |
| BYR-366P[4] | 10 | 8 | 10 | 10 | 10 |
| Benzoin | 10 | 8 | 10 | 10 | 10 |
| Properties | | | | | |
| Pencil Hardness | 3H | 4H | 4H | 4H | 4H |
| Crosshatch adhesion (%) | 100 | 100 | 100 | 100 | 100 |

TABLE 3-continued

| | Example No. | | | | |
|---|---|---|---|---|---|
| Materials | 17 | 18 | 19 | 20 | 21 |
| MEK Double rubs (# of pass) | 20 | 20 | 28 | 30 | 20 |
| Smoothness | excellent | excellent | excellent | excellent | excellent |
| 20° Degree gloss (%) | — | 86 | 83 | 90 | 85 |
| 60° Degree gloss (%) | — | 96 | 98 | 98 | 98 |

[1]Product of Ciba Geigy
[2]Product of DuPont Corporation
[3]Product of Air Products Corporation
[4]Product of BYK Chemie

TABLE 4

| | Example No. | | |
|---|---|---|---|
| | 22 | 23 | 24 |
| Materials | Amounts Employed (grams) | | |
| Resin from Example | 15 | 15 | 5 |
| Fineclad 229-30[1] | — | — | 195 |
| Fineclad 244-A[1] | 212 | 212 | — |
| Dodecanoic acid | 38.6 | 38.6 | 44.4 |
| Tipure R-900[2] | 162 | 162 | 324 |
| Curzol C17z[3] | 8 | 8 | 8 |
| BYK-366P[4] | 9.6 | — | 11.1 |
| Benzoin | 9.6 | — | 11.1 |
| Properties | | | |
| Pencil hardness | H | H | H |
| Crossbatch adhesion (%) | 100 | 100 | 100 |
| MEK Double rubs (# of pass) | 40 | 50 | 20 |
| Smoothness | excellent | excellent | excellent |

TABLE 4-continued

| | Example No. | | |
|---|---|---|---|
| | 22 | 23 | 24 |
| 20° Degree Gloss (%) | 2 | 5 | 66 |
| 60° Degree Gloss (%) | 7 | 35 | 88 |

[1]Product of Reichold Chemical Company
[2]Product of DuPont Corporation
[3]Product of Air Products Corporation
[4]Product of BYK Chemic From the above description, it is apparent that the objects of the present invention have been achieved. While only certain embodiments and various modifications have been described, numerous alternative embodiments and various modifications will be apparent from the above description to those skilled in the art. These alternatives and embodiments are considered equivalents and within the spirit and scope of the present invention.

That which is claimed is:

1. A carboxyl group-containing polyester resin for use in a powder coating and comprising
   (a) from about 45 to 55 mole percent of an aromatic diacid component of which at least 90 mole percent is isophthalic acid,
   (b) from about 40 to about 50 mole percent of a diol component,
   (c) from about 0 to about 7 mole percent of an aliphatic diacid containing from 4 to 13 carbon atoms, and
   (d) from about 0 to about 3 mole percent of a branching agent having at least 3 alcohol or acid groups or both,
   such that the polyester resin has a glass transition temperature of 44° to 55° C., an adid number of 35–55 milligrams of potassium hydroxide per gram of resin, a hydroxyl number less than 10 milligrams of potassium per gram of resin, and a viscosity of less than 1500 centipoise as measured at 220° C. by an ICI cone and plate viscometer.

2. The polyester resin of claim 1 comprising from about 47 to about 52 mole percent of the aromatic diacid component.

3. The polyester resin of claim 1, wherein the aromatic diacid component comprises up to 10 mole percent of terephthalic acid.

4. The polyester resin of claim 1 wherein the diol component is at a level of from about 45 to about 50 mole percent.

5. The polyester resin of claim 1 wherein the diol component comprises at least one glycol containing from two to ten carbon atoms.

6. The polyester resin of claim 1 wherein the diol component comprises at least one of neopentyl glycol and 2-methyl-1,3-propanediol.

7. The polyester resin of claim 6 wherein the diol component comprises from about 70 to about 100 weight percent of neopentyl glycol, up to about 30 weight percent of ethylene glycol and up to about 20 weight percent of a linear aliphatic glycol containing from four to twelve carbon atoms.

8. The polyester resin of claim 7 wherein the aforesaid linear aliphatic diol is 1,4-butanediol or 1,6-hexanediol.

9. The polyester resin of claim 1 wherein the aliphatic diacid is at a level of from about 2 to about 5 mole percent.

10. The polyester resin of claim 1 wherein the aliphatic diacid is adipic acid, succinic acid, maleic acid, or fumaric acid.

11. The polyester resin of claim 10 wherein the aliphatic diacid is adipic acid.

12. The polyester resin of claim 1 wherein the branching agent is at a level of from about 0.2 to about 1 mole percent.

13. The polyester resin of claim 1 wherein the branching component is trimethylolpropane or trimellitic anhydride.

14. The polyester resin of claim 1 comprising
   (a) from about 47 to about 50 mole percent of an aromatic diacid component comprising at least about 95 mole percent of isophthalic acid and up to about 5 weight percent of terephthalic acid;
   (b) from about 45 to about 50 mole percent of a glycol component comprising at least about 80 weight percent of neopentyl glycol;
   (c) from about 2 to about 5 mole percent of adipic acid; and
   (d) from about 0.2 to about 1 mole percent of the branching agent.

15. The polyester resin of claim 1 comprising
   (a) from about 50 to about 55 mole percent of an aromatic diacid component comprising at least about 95 mole percent of isophthalic acid and up to about 5 weight percent of terephthalic acid;
   (b) from about 45 to about 50 mole percent of a glycol component comprising at least about 60 weight percent of neopentyl glycol, from about 5 to about 20 mole percent of ethylene glycol and from about 5 to about 20 mole percent of 1,6-hexanediol;
   (c) from about 0 to about 1 mole percent of adipic acid; and
   (d) from about 0.2 to about 1 mole percent of the branching agent.

16. The polyester resin of claim 1 comprising
   (a) from about 47 to about 52 mole percent of isophthalic acid;
   (b) from about 45 to about 50 mole percent of neopentyl glycol;
   (c) from about 2 to about 4 mole percent of adipic acid; and
   (d) from about 0.1 to about 0.4 mole percent of trimethylolpropane or trimellitic anhydride;
   such that the acid number is from about 40 to about 45 milligrams of potassium hydroxide per gram of polyester resin, a hydroxyl number of less than about 10 milligrams of potassium hydroxide per gram of polyester resin, a glass transition temperature of 45–52° C. and a melt viscosity of less than about 1300 centipoise.

17. The polyester resin of claim 1 comprising
   (a) from about 47 to about 52 mole percent of isophthalic acid;
   (b) from about 30 to about 45 mole percent of neopentyl glycol up to about 10 mole percent of ethylene glycol and up to about 10 mole percent of 1,6-hexanediol;
   (c) from about 0 to about 5 mole percent of adipic acid; and
   (d) from about 0.1 to about 0.4 mole percent of trimethylol propane or trimellitic anhydride;
   such that the acid number is from about 40 to about 45 milligrams of potassium hydroxide per gram of polyester resin, a hydroxyl number of less than about 10 milligrams of potassium hydroxide per gram of polyester resin, a glass transition temperature of 44–50° C., and a melt viscosity of less than about 1300 centipoise.

18. The polyester resin of claim 1 comprising
(a) from about 47 to about 52 mole percent of isophthalic acid;
(b) from about 25 to about 45 mole percent of neopentyl glycol up to about 10 mole percent of ethylene glycol and up to about 10 mole percent of 1,6-hexanediol, and up to about 10 mole percent of a cyclic diol selected from the group consisting of cyclohexanedimethanol, hydrogenated bisphenol A, the ethyleneoxide adduct of bisphenol A, and a combination thereof;
(c) from about 0 to about 5 mole percent of adipic acid; and
(d) from about 0.1 to about 0.4 mole percent of trimethylol propane or trimellitic anhydride;
such that the acid number is from about 40 to about 45 milligrams of potassium hydroxide per gram of polyester resin, a hydroxyl number of less than about 10 milligrams of potassium hydroxide per gram of polyester resin, a glass transition temperature of 45–55° C., and a melt viscosity of less than about 1300 centipoise.

19. A powder coating comprising a homogeneous mixture of polyepoxy resin and the polyester resin of claim 1.

20. The powder coating of claim 19, comprising the polyester resin and a stoichiometric amount of the polyepoxy resin selected from the group consisting of triglycidylisocyanurate, diglycidyl bisphenol A, and polymers containing moieties of diglycidylbis phenol A, glycidylmethacrylate or glycidylacrylate.

21. A coated article formed by coating a substrate with the powder coating of claim 19.

22. The coated article of claim 21 wherein the substrate is medium density fiber board.

* * * * *

UNITED STATES PATENT AND TRADEMARK OFFICE
CERTIFICATE OF CORRECTION

PATENT NO. : 6,555,226 B1
DATED : April 29, 2003
INVENTOR(S) : Mathew A. Kulzick and Wayne R. Pretzer It is certified that error appears in the above-identified patent and that said Letters Patent is hereby corrected as shown below:

Column 11,
Lines 36-37, "of potassium per gram of resin" should read -- of potassium hydroxide per gram of resin --

Signed and Sealed this

Twenty-third Day of September, 2003

JAMES E. ROGAN
*Director of the United States Patent and Trademark Office*